US012730581B2

(12) United States Patent
Raghunath et al.

(10) Patent No.: US 12,730,581 B2
(45) Date of Patent: Sep. 8, 2026

(54) COMPUTATIONAL STORAGE FOR LOGICAL VOLUMES THAT SPAN PHYSICAL DEVICES

(71) Applicant: Intel Corporation, Santa Clara, CA (US)

(72) Inventors: Arun Raghunath, Portland, OR (US); Scott Peterson, Beaverton, OR (US); Kimberly A. Malone, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 17/814,724

(22) Filed: Jul. 25, 2022

(65) Prior Publication Data

US 2022/0365709 A1 Nov. 17, 2022

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS 10,878,883 B2 * 12/2020 Murphy .............. G11C 11/4091
2008/0109620 A1 * 5/2008 Nabekura ............. G06F 3/0604
711/162
2009/0144347 A1 * 6/2009 Boyd .................... G06F 16/122
2021/0279007 A1 9/2021 Trika
2021/0373805 A1 * 12/2021 Alsop ................... G06F 3/0629
2021/0389890 A1 12/2021 Trika
2022/0011935 A1 * 1/2022 Pitchumani ......... G06F 11/1076
2022/0197704 A1 * 6/2022 Gibb ..................... G06F 9/5038
2023/0195645 A1 * 6/2023 Puthoor .............. G06F 12/0238
711/209

OTHER PUBLICATIONS

NVM Express Inc., "NVM Express® Base Specification, revision 2.0b," <nvmexpress.org/wp-content/uploads/NVM-Express-Base-Specification-2.0b-2021.12.18-Ratified.pdf>, Jan. 6, 2022, 455 pages.
Wikipedia, "Computer data storage", <en.wikipedia.org/wiki/Computer_data_storage>, retrieved Jun. 27, 2022, 19 pages.

(Continued)

*Primary Examiner* — Jared I Rutz
*Assistant Examiner* — Elias Young Kim
(74) *Attorney, Agent, or Firm* — Compass IP Law PC

(57) ABSTRACT

Systems, apparatuses and methods may provide for technology that identifies a first namespace descriptor, a device memory descriptor, and a first request to execute a program on a logical volume that spans a plurality of physical drives, selects a first target drive from the plurality of physical drives based on the first namespace descriptor, and configures the first target drive to execute the program on first input data associated with the first namespace descriptor and write a first output of the program to a first memory region in an internal memory of the first target drive. In one example, the technology maps the device memory descriptor to the first memory region.

20 Claims, 5 Drawing Sheets

(56) References Cited

OTHER PUBLICATIONS

Wikipedia, “Data striping”, <en.wikipedia.org/wiki/Data_striping>, retrieved Jun. 27, 2022, 3 pages.

Wikipedia, “Device file”, <en.wikipedia.org/wiki/Device_file>, retrieved Jun. 27, 2022, 12 pages.

Wikipedia, “Disk partitioning”, <en.wikipedia.org/wiki/Disk_partitioning>, retrieved Jun. 27, 2022, 7 pages.

Wikipedia, “Mass storage”, <en.wikipedia.org/wiki/Mass_storage>, retrieved Jun. 27, 2022, 4 pages.

* cited by examiner

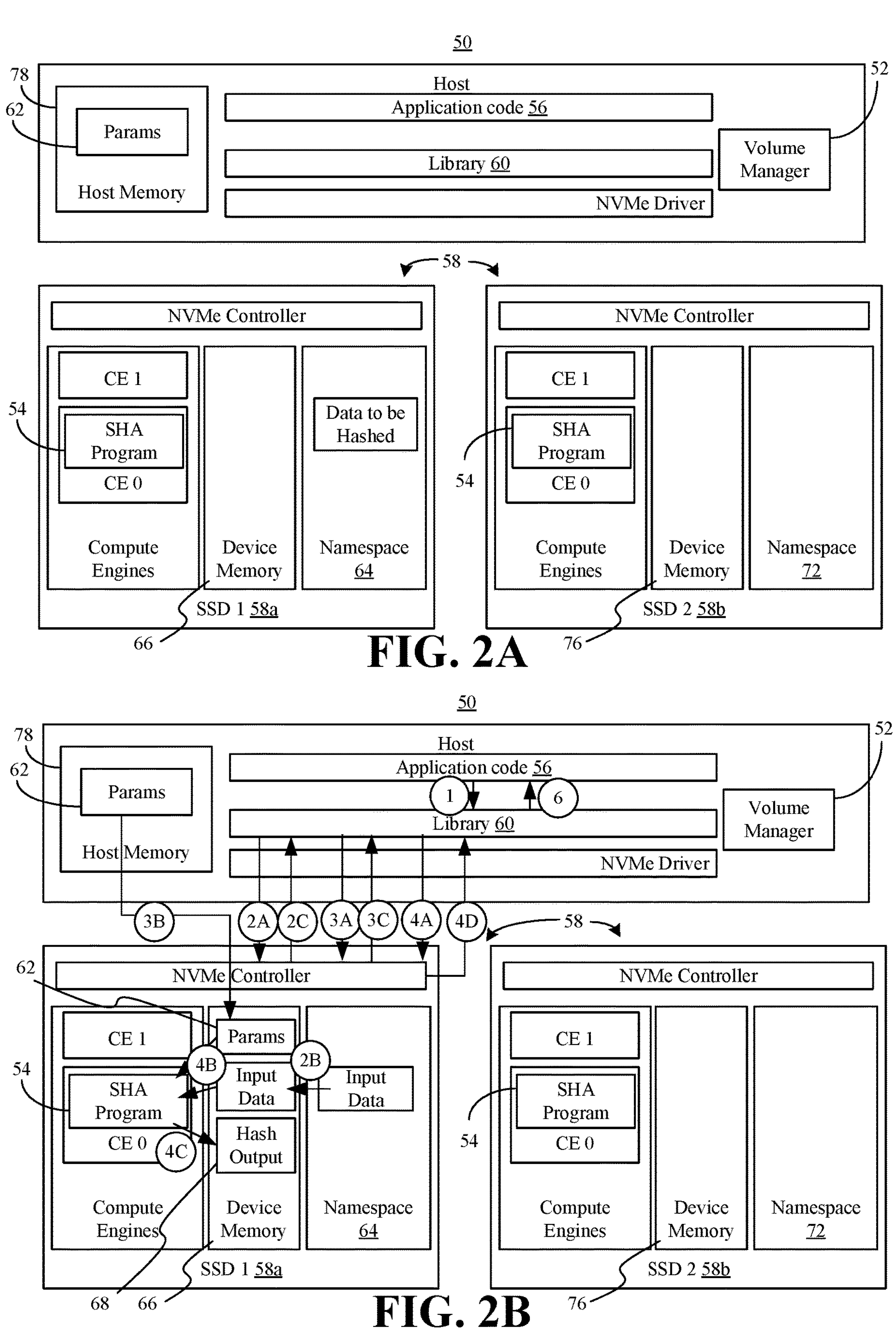

50
Host
Application code 56
Params
Host Memory
Library 60
NVMe Driver
Volume Manager
78
62
52
58
NVMe Controller
CE 1
SHA Program
CE 0
Compute Engines
Device Memory
Data to be Hashed
Namespace 64
SSD 1 58a
NVMe Controller
CE 1
SHA Program
CE 0
Compute Engines
Device Memory
Namespace 72
SSD 2 58b
54
54
66
76
FIG. 2A
50
Host
Application code 56
1
6
Library 60
NVMe Driver
Params
Host Memory
Volume Manager
78
62
52
3B
2A
2C
3A
3C
4A
4D
58
NVMe Controller
Params
CE 1
4B
2B
Input Data
Input Data
SHA Program
CE 0
4C
Hash Output
Compute Engines
Device Memory
Namespace 64
SSD 1 58a
62
54
68
66
NVMe Controller
CE 1
SHA Program
CE 0
Compute Engines
Device Memory
Namespace 72
SSD 2 58b
54
76
FIG. 2B

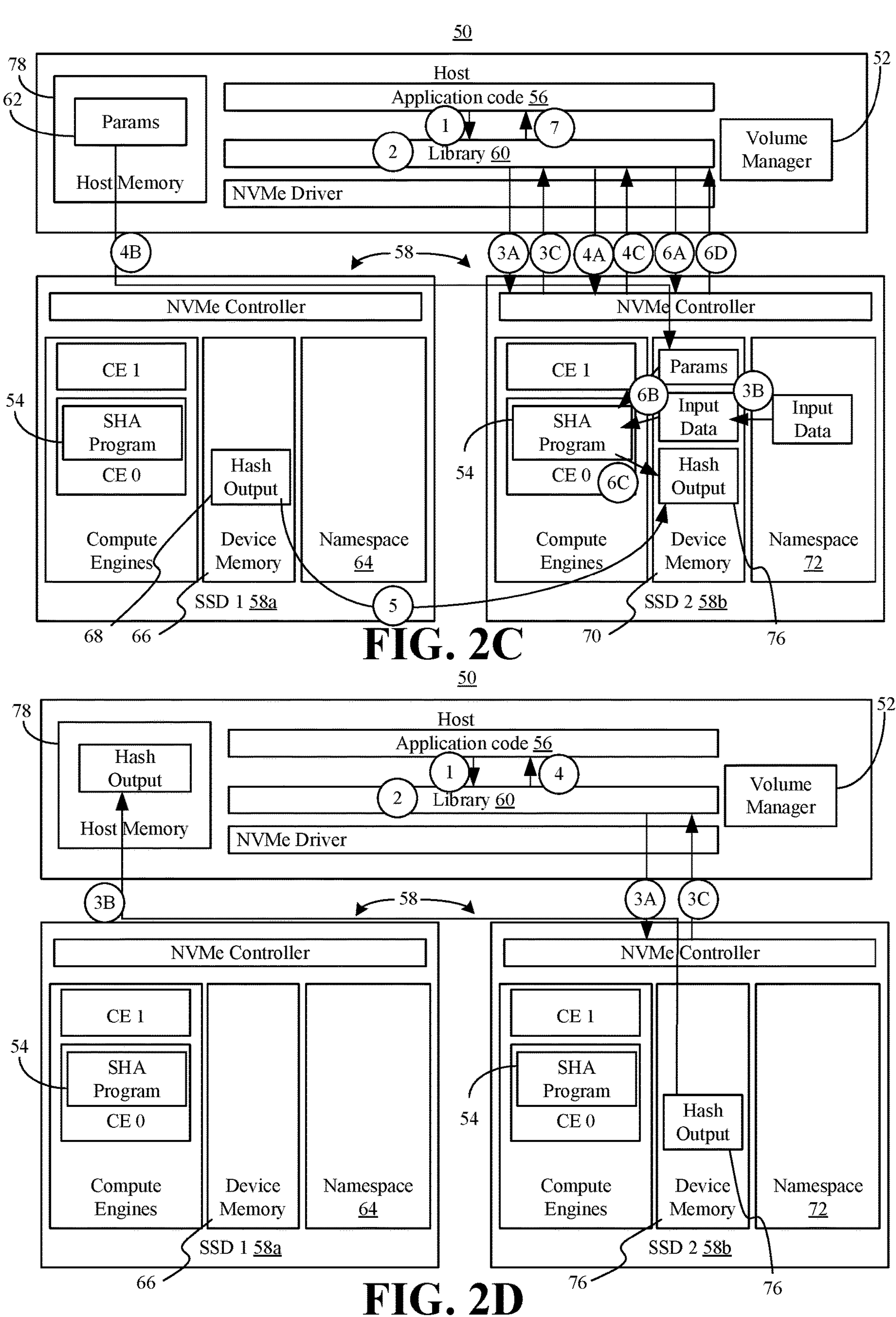

50
Host
Application code 56
Library 60
NVMe Driver
Params
Host Memory
Volume Manager
1
2
7
3A
3C
4A
4C
6A
6D
4B
58
NVMe Controller
CE 1
SHA Program
CE 0
Compute Engines
Hash Output
Device Memory
Namespace 64
SSD 1 58a
Params
Input Data
Input Data
Hash Output
6B
3B
6C
5
Namespace 72
SSD 2 58b
78
62
52
54
68
66
70
76
FIG. 2C
50
Host
Application code 56
Library 60
NVMe Driver
Hash Output
Host Memory
Volume Manager
1
2
4
3A
3C
3B
58
NVMe Controller
CE 1
SHA Program
CE 0
Compute Engines
Device Memory
Namespace 64
SSD 1 58a
Hash Output
Namespace 72
SSD 2 58b
78
52
54
66
76
FIG. 2D

COMPUTATIONAL STORAGE FOR LOGICAL VOLUMES THAT SPAN PHYSICAL DEVICES

TECHNICAL FIELD

Embodiments generally relate to storage devices. More particularly, embodiments relate to computational storage for logical volumes that span physical devices.

BACKGROUND

Computational storage (CS) is a technique that may move compute operations to data, rather than moving data to the primary central processing unit (CPU) of a system for calculations to be performed. Computational storage is currently being defined in the industry to work on a single device basis. Typical deployments and larger systems, however, often expose logical volumes that can span more than one physical device (e.g., redundant array of inexpensive disks/RAID).

BRIEF DESCRIPTION OF THE DRAWINGS

The various advantages of the embodiments will become apparent to one skilled in the art by reading the following specification and appended claims, and by referencing the following drawings, in which:

FIGS. 2A-2D are block diagrams of an example of a sequence of states in a computing system according to an embodiment;

DESCRIPTION OF EMBODIMENTS

In computer storage, logical volume management (LVM) provides a method of allocating space on mass-storage devices that is more flexible than conventional partitioning schemes to store volumes. In particular, a volume manager can concatenate, stripe together or otherwise combine partitions (or block devices in general) into larger virtual partitions that administrators can re-size or move, potentially without interrupting system use. These virtual partitions may be referred to as logical volumes.

Figure 1:
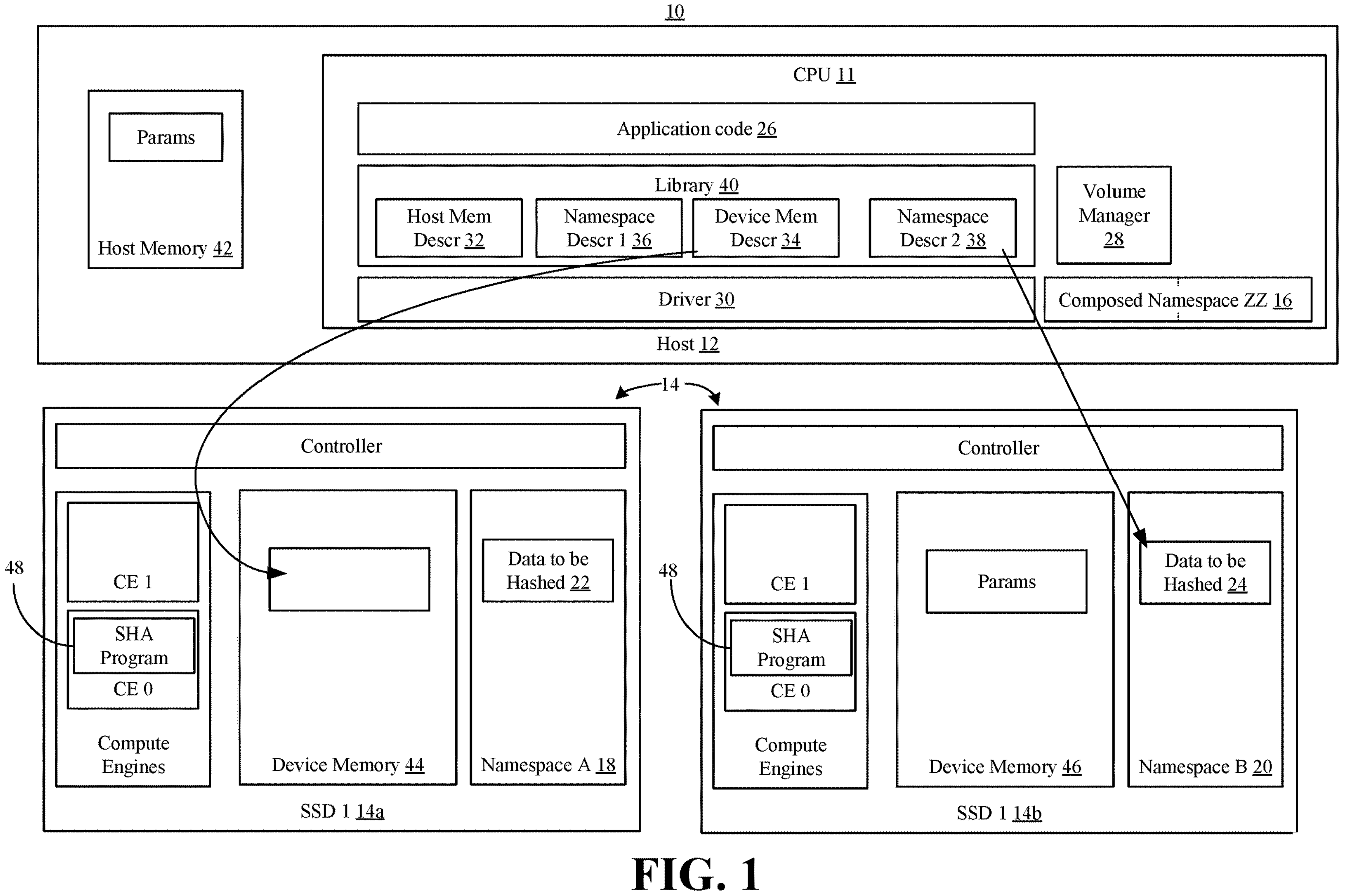
FIG. 1 is a block diagram of an example of a computing system according to an embodiment.

Turning now to FIG. 1, a computing system 10 is shown in which a host 12 is coupled to a plurality of physical drives 14 (14*a,* 14*b,* e.g., solid state drive/SSD1 and SSD2, respectively). The computing system 10 may be part of a server (e.g., data center, cloud computing infrastructure), desktop computer, notebook computer, tablet computer, convertible tablet, smart television (TV), personal digital assistant (PDA), mobile Internet device (MID), smart phone, wearable device, media player, vehicle, robot, Internet of Things (IoT) device, drone, autonomous vehicle, etc., or any combination thereof. The physical drives 14 may also include software defined storage (SDS) or other storage device.

A composed namespace 16 (e.g., "Composed Namespace ZZ") may be defined as a namespace that spans the physical drives 14. Thus, the composed namespace 16 may be a logical construct on the host 12, and implemented using, for example, a concatenation of a physical namespace 18 (e.g., "Namespace A") and a physical namespace 20 (e.g., "Namespace B") on each of the physical drives 14. In one example, the composed namespace 16 is an NVMe (Non-Volatile Memory Express, e.g., NVM EXPRESS, Base Specification, Revision 1.4, Jun. 10, 2019) equivalent of a logical volume. The computing system 10 may also include other more complex configurations as well, including cases with many more storage devices, remote (e.g., NVMe over Fabrics/NVMe-oF) storage devices, placement functions far more complex than concatenation, and different types of volume managers 28 (e.g., perhaps not part of the local operating system/OS). There are several challenges in conducting computational storage operations over the composed namespace 16.

For example, a first portion 22 (e.g., data to be hashed) of the composed namespace 16 may be stored in the physical namespace 18 of a first drive 14*a* and a second portion 24 (e.g., data to be hashed) of the composed namespace 16 may be stored in the physical namespace 20 of a second drive 14*b,* wherein the composed namespace 16 may simply be the concatenation of the physical namespace 18 and the physical namespace 20.

In an embodiment, application code 26 observes the composed namespace 16 and is unaware of the underlying physical drives 14. This configuration presents a first problem since the computational storage commands are to be sent to the drive 14 where the data is persisted. Even if the volume manager 28 can provide some interface to list the underlying drives 14 for a logical volume, this listing may also be insufficient. In one example, a namespace extent is considered a range of logical block addresses/LBAs in the namespaces 18, 20. For each namespace extent on which computational storage is to be executed, the application code 26 would need to be aware of which part of the extent is persisted on which drive 14. Exposing these details to the application code 26 defeats the purpose of the logical volume abstraction provided by the volume manager 28.

Considering other components in the stack, a device driver 30 has information about the device capabilities (e.g., available compute and memory resources) of the drives 14, but has no information about the logical volume mapping as that abstraction is "above" the driver 30 in the stack. The volume manager 28 has complete information about the layout of the namespaces 18, 20 on the underlying drives 14, and therefore may also locate the correct drive 14 for a particular namespace extent. Typical CS commands, however, do not refer to the data ranges of the namespaces 18, 20. In such cases, the volume manager 28 could choose any drive 14, but then would need to maintain state to correctly direct related CS commands.

State maintenance can become very challenging given the CS programming model. For example, the application code 26 can issue a CS command and have the execution result placed in some on-drive memory location (e.g., say memory on SSD1). It is reasonable for the application code 26 to expect to use this result from device memory, in a subsequent CS command. This expectation poses numerous problems for any entity such as, for example, the volume manager 28, that maintains state for CS command execution. If the namespace extent for a subsequent CS command requires the program to be executed on a different drive (e.g., say SSD2), then the results (e.g., stored in memory on SSD1) are to be moved over to the new drive (SSD2). First, there is no conventional way for such an entity to determine the memory location of the result on a drive 14, short of inspecting the CS program code, from where to source the move (e.g., presenting a first technical problem relating to source).

Moreover, for transparency purposes, the application code 26 may expect to use the results from the memory location where an earlier CS program wrote the results. This expectation becomes challenging if that memory offset on the new drive 14 (e.g., SSD2) is already in use (e.g., presenting a second technical problem relating to destination). Thus, moving result data transparently from one drive 14 to another between CS program executions is challenging from both a source and a destination perspective. A brute force approach of moving the entire contents of memory from SSD1 to SSD2 could be taken, but this approach would be very inefficient and impractical in a multi-tenant environment.

Library Solution

To address the issues highlighted above, embodiments introduce the concept of descriptors 32, 34, 36, 38. A descriptor 32, 34, 36, 38 essentially adds a layer of indirection that provides sufficient information to efficiently manage the state needed for handling CS commands. Technology described herein includes a library 40 that executes on a processor 11 (e.g., CPU) of the host 12 and provides different types of descriptors 32, 34, 36, 38 per available resource that are used for CS commands. For example, a host memory descriptor 32 refers to a region in host memory 42 (e.g., system memory), while a device memory descriptor 34 refers to a region in, for example, a device memory 44 (e.g., internal memory) of the first drive 14*a*. Each descriptor 32, 34, 36, 38 maintains state about the memory offset, length, and mode (e.g., read/write) for the referred memory region. Embodiments also introduce namespace descriptors 36, 38 to refer to the namespace extent used in a CS command. This approach enables the library 40 to move data from the namespace extent into, for example, the device memory 44 for use by a CS program.

As will be discussed in greater detail, the application code 26 works with the descriptors 32, 34, 36, 38, which enable the library 40 to access physical resources such as the host memory 42, the device memory 44 and/or the namespaces 18, 20. The library 40 changes the state of the descriptors 32, 34, 36, 38 to switch resources being addressed by the descriptors 32, 34, 36, 38. Additionally, the library 40 manages the transfer of data in, for example, the device memory 44. In an embodiment, the library 40 also decides which device resources to use, manages the initialization of device resources, and manages the transfer of data to and from the device memory 44 when switching between drives 14.

In one example, the library 40 defines an API (application programming interface) that the application code 26 uses to setup and execute CS operations over logical volumes. The application code 26 performs CS operations via the descriptors 32, 34, 36, 38 provided by the library 40 through the API of the library 40. For CS commands that do not include namespace extents, but rather merely setup state before executing the CS program, the library 40 simply collects the state in the descriptors 32, 34, 36, 38. This approach enables the library 40 to delay the moment at which a drive 14 is chosen on which the CS program is to be executed. Once sufficient information is available, the library 40 decides which drive 14 and which device resources to use. The library 40 manages the initialization of the device resources based on the state collected in the descriptors 32, 34, 36, 38. For example, the state might contain initial values for the device memory 44 referred to by the device memory descriptor 34.

In an embodiment, there may be a scenario in which a CS program 48 such as, for example, a secure hashing algorithm (SHA) program, is to be executed on the second drive 14*b* (e.g., SSD2), but the results from a prior command execution reside in the device memory 44 of the first drive 14*a*. Since the application code 26 uses the descriptors 32, 34, 36, 38, the library 40 is aware of the exact memory region (e.g., from descriptor offset, length and write mode) where the results are present on the first drive 14*a* (e.g., solving the first technical problem relating to source, described above). Accordingly, the library 40 can copy over this region into the second drive 14*b* and transparently change (e.g., re-map) the device memory descriptor 34 to refer to a memory region in a device memory 46 of the second drive 14*b* where the results data is copied.

Since the application code 26 only works with the descriptors 32, 34, 36, 38, the SSD2 memory region could be at a completely different offset if needed, without impacting the application code 26 (e.g., solving the second technical problem relating to destination, described above). Similarly, other descriptors 32, 34, 36, 38 used by the application code 26 can also be changed transparently by the library 40, depending on the specific drive 14 chosen for a given CS program execution. For the namespace descriptors 36, 38, the library 40 copies data from the drive 14 into device memory 44, 46 and updates the namespace descriptor 36, 38 to refer to this device memory region.

Thus, with the indirection created via the descriptors 32, 34, 36, 38, the library 40 can collect sufficient information to choose the correct drive 14 for a given CS program execution. The library 40 can also maintain the required state to efficiently move results in device memory 44, 46 when the CS program execution shifts between drives 14 (e.g., based on namespace extents).

Turning now to FIGS. 2A-2D, a sequence of states in a computing system 50 that uses a CS program 54 to perform 256-bit SHA (e.g., SHA-256) operations on a region in a logical volume maintained by a volume manager 52. In this case, the CS program 54 operates on a sequence of bits, 512 bits at a time, wherein some bits are appended to the sequence. The appended bits include the length (e.g., in bits) of the sequence, and enough padding bits to make the padded bit sequence a multiple of 512 bits in length.

In this example, input data is not located entirely in the same CS device. In an embodiment, the volume manager 52 is aware of the placement of the input data but application code 56 is not aware of the placement of the input data. Moreover, the input data is consumed in order. The results of a hash operation “n” are used by a hash operation “n+1”, so no concurrency or reordering is possible. Additionally, the CS program 54 can process the data incrementally, in units (or “chunks”) of any convenient size.

There are many CS programs 54 that have these similar properties (e.g., operating on data in order). Searching a file for a pattern or comparing two files are other examples of CS applications that would use this model.

Not all CS applications consume the stored data in order. Counting the occurrences of a value in a column of data is an example of a CS application that could process data chunks in any order, or potentially be processed concurrently.

In one example, the overall data to be hashed in a composed namespace spans two physical drives 58 (58*a*, 58*b*), wherein a library 60 uses the volume manager 52 to learn the locations of the extents on the underlying physical drives 58. The CS program 54 hashes the data incrementally in chunks of a certain size. The library 60 enables application code 56 to learn what size and alignment the chunks should be so that each chunk is contained in a single physical drive 58. The CS program 54 then iterates over the chunks of the logical volume region to be hashed, computing each incremental portion of the SHA256 in the drive 54 containing that chunk. If the application code 56 makes an API call with a chunk that spans more than one physical drive 58, the library 60 reports a failure.

As best shown in FIG. 2A, an initial state of the application code 56 requests the library 60 to use the CS program 54 on the logical volume. If the library 60 can load the CS program 54 on all of the physical drives 58 that contain the logical volume, the library 60 will indicate success and return a handle for the application code 56 to use when referring to the CS program 54 later. Whether the library 60 actually loads the CS program 54 on any physical drive 58 before indicating success is up to the library 60. This indication can either be done once on every drive 58 that contains extents of the logical volume, or the CS program 54 can be loaded on-demand based on the namespace extent for the more recent CS command. The application code 56 has defined parameters 62 ("params", e.g., including a device memory descriptor) indicating the intermediate state of the CS program 54, and the initial value of the CS program 54.

As best shown in FIG. 2B, the first iteration of the application code 56 will produce a sequence of operations in the library 60, wherein the application code 56 defines a namespace descriptor referring to the first data chunk on which it will operate. The library 60 is aware of which physical drive 58 contains that chunk. The application code 56 then invokes the CS program 54 previously loaded via the library 60, passing both the descriptor for the intermediate results (e.g., device memory descriptor) and the namespace descriptor.

The library 60 then has all information necessary to determine where to run the CS program 54. In this example, the library 60 chooses a first physical drive 58*a* (e.g., SSD1) because the library 60 is aware that the chunk described in that namespace descriptor is located on SSD1. Before the CS program 54 is run on SSD1, the library 60 prepares the device memory in SSD1 that the CS program will use to execute. Here, that includes loading initial values into a device memory 66 (e.g., internal memory) on SSD1 containing the intermediate results, and reading the data in that chunk from a namespace 64 on SSD1 into the device memory 66 on SSD1. Finally, the library 60 activates the CS program 54 specified by the application code 56 on the data that the library 60 has placed in the device memory 66 on SSD1.

More particularly, a first operation (e.g., encircled "1") enables an SSD to be chosen by the library 60 based on the location of input data. A second set of operations (e.g., encircled "2A", "2B" and "2C") provide for non-volatile memory (NVM) reading input data into to the device memory 66. For example, the library 60 issues an NVM read command in operation 2A, the input data is written to the device memory 66 in operation 2B, and the first physical drive 58*a* confirms that the memory write command has completed in operation 2C.

A third set of operations (e.g., encircled "3A", "3B", and "3C") involve the host writing the parameters 62 to the device memory 66. For example, the library 60 issues a memory write command in operation 3A, the parameters 62 are written to the device memory 66 in operation 3B, and the first physical drive 58*a* confirms that the memory write command has completed in operation 3C.

A fourth set of operations (e.g., encircled "4A", "4B", "4C", and "4D") provide for executing the CS program 54. For example, the library 60 issues an execute command in operation 4A, the CS program 54 runs in operation 4B using the data to be hashed and the parameters 62 from the device memory 66. Additionally, the CS program 54 writes a hash output 68 to the device memory 66 in operation 4C and the first physical drive 58*a* confirms that the execution command has completed in operation 4D. Optionally, the parameters 62 and the input data may be cleared from the device memory 66.

The application code 56 may continue to iterate over successive chunks of data in this fashion, incrementally generating the SHA256 of the entire set of data. Subsequent states of the application code 56 that operate on chunks in the first physical drive 58*a* will also proceed as described above. The library 60 will not initialize the device memory 66 described by the parameters 62 (e.g., device memory descriptor), because the parameters 62 have already been used by the CS program 54 in SSD1, and the library 60 is aware that the CS program 54 may have modified the parameters 62.

In this regard, the library 60 enables the application code 56 to pass a set of input and output descriptors to the CS program 54. A descriptor can be both an input and an output, meaning that, for example, the corresponding device memory 66 is initialized (or copied) before the CS program 54 executes, and that the CS program 54 will make modifications to the device memory 66. Moreover, the library 60 will preserve the modifications for the next reader. Here, the parameters 62 are passed to the CS program 54 as both an input and an output.

As best shown in FIG. 2C, as the application code 56 iterates over the chunks of data in the logical volume, the chunks may not all reside on the same physical drive 58. When the data to be hashed in an iteration of the application code 56 resides in a different physical drive 58 than the previous iteration, the library 60 will transparently migrate the intermediate state (and possibly others) of memory as appropriate.

More particularly, the library 60 might determine from the namespace descriptor passed to the CS program 54 by the application code 56 that the CS program 54 is to execute on a second physical drive 58*b* (e.g., SSD2). The library 60 is aware that the current contents of the other descriptor/parameters 62 passed to the CS program 54 reside on SSD1. The library 60 then copies (via, e.g., a peer-to-peer transfer between SSDs or other relatively fast approach) the hash output 68 (e.g., SHA256 intermediate results) from SSD1 to SSD2. The library 60 then reads the data in this chunk from a namespace 72 (e.g., in NVM) on SSD2 into a device memory 70 on SSD2, and executes the CS program 54 in SSD2.

For example, the application code 56 might request a hash of byte Y+X+Z in a composed namespace via a first operation (e.g., encircled "1"), wherein the request enables an SSD to be chosen by the library 60 based on the location of input data in a second operation (e.g., encircled "2"). A third set of operations (e.g., encircled "3A", "3B", and "3C") provide for reading the input data into the device memory 70. For example, the library 60 issues an NVM read command in operation 3A, the input data is written to the device memory 70 in operation 3B, and the second physical drive 58*b* confirms that the memory write command has completed in operation 3C.

A fourth set of operations (e.g., encircled "4A", "4B", and "4C") involve writing the parameters 62 to the device memory 70. For example, the library 60 issues a memory write command in operation 4A, the parameters 62 are written to the device memory in operation 4B, and the second physical drive 58*b* confirms that the memory write command has completed in operation 4C. In the SHA256 example, the parameters 62 might contain a "last chunk" flag, which the application would set in the params struct in host memory 78 before passing that host memory descriptor to the library 60 to invoke the CS program 54 for the last time. Additionally, the host writes the hash output 68 from the device memory 66 in SSD1 to the device memory 70 in SSD2 via a fifth operation (e.g., encircled "5").

A sixth set of operations (e.g., encircled "6A", "6B", "6C", and "6D") provide for executing the CS program 54. For example, the library 60 issues an execute command in operation 6A, the CS program 54 runs in operation 6B using the data to be hashed and the parameters 62 from the device memory 70. Additionally, the CS program 54 writes a hash output 76 to the device memory 70 in operation 6C and the second physical drive 58*b* confirms that the execution command has completed in operation 6D. Additionally, the API call of the application code 56 completes in a seventh operation (e.g., encircled "7").

As best shown in FIG. 2D, when the application code 56 has iterated over all chunks of data in the physical drives 58, the application code 56 reads the hash output 76 (e.g., accumulated results) from, for example, the device memory 70 in SSD2. The library 60 enables this transfer via the descriptor for the device memory 70, which identifies that the SSD2 currently contains that data.

More particularly, the application code 56 requests a read of the hash results via a first operation (e.g., encircled "1"), wherein the request enables an SSD to be chosen by the library 60 based on the location of the hash output 76 in a second operation (e.g., encircled "2"). A third set of operations (e.g., encircled "3A", "3B", and "3C") provide for the host reading the hash output 76 from the device memory 70 to a host memory 78. For example, the library 60 issues a memory read command in operation 3A, the hash output 76 is copied to the host memory 78 in operation 3B, and the second physical drive 58*b* confirms that the read command has completed in operation 3C. Additionally, the library 60 returns the hash output 76 to the application code 56 in a fourth operation (e.g., encircled "4").

Figure 3:
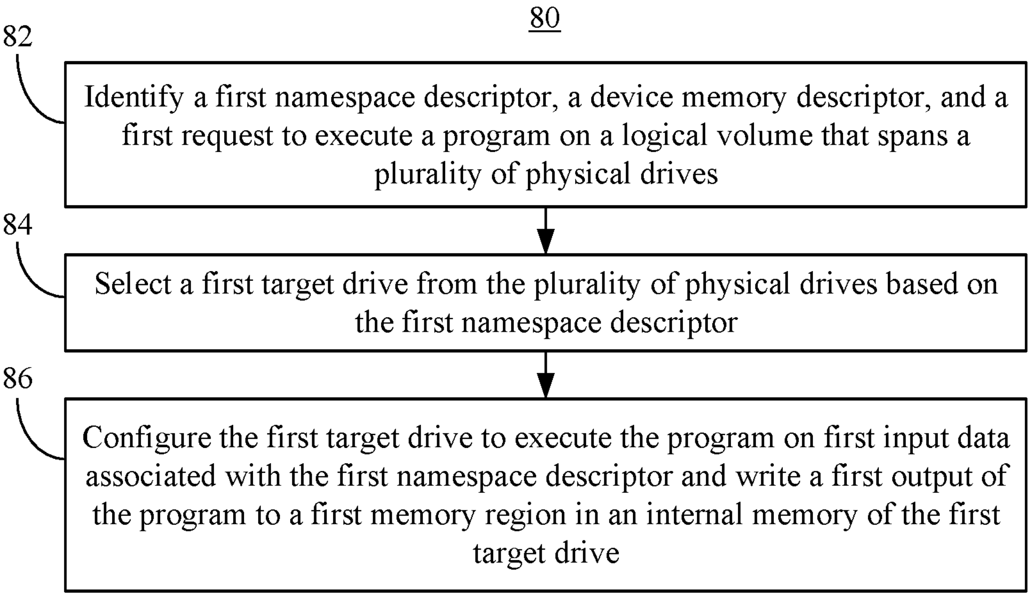
FIG. 3 is a flowchart of an example of a method of operating a library with respect to an initial request to execute a program on a logical volume that spans a plurality of physical drives according to an embodiment.

FIG. 3 shows a method 80 of operating a library with respect to an initial (e.g., first) request to execute a program on a logical volume that spans a plurality of physical drives. The method 80 may generally be implemented in a library such as, for example, the library 40 (FIG. 1) and/or the library 60 (FIGS. 2A-2D), already discussed. More particularly, the method 80 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic include suitably configured programmable logic arrays (PLAs), field programmable gate arrays (FPGAs), complex programmable logic devices (CPLDs), and general purpose microprocessors. Examples of fixed-functionality logic include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Illustrated processing block 82 provides for identifying (e.g., receiving in an application code message) a first namespace descriptor, a device memory descriptor, and a first request to execute a program on the logical volume that spans a plurality of physical drives. Additionally, block 84 selects a first target drive from the plurality of physical drives based on the first namespace descriptor. Block 86 configures the first target drive to execute the program on first input data associated with the first namespace descriptor and write a first output of the program to a first memory region in an internal memory of the first target drive. In one example, block 86 also includes writing the program to the plurality of physical drives. The method 80 therefore enhances performance at least to the extent that the first namespace descriptor and the device memory descriptor provide an extra level of indirection that enables application code to remain agnostic with respect to drive resources and/or the locations of the input data and the output of the program in the logical volume.

Figure 4:
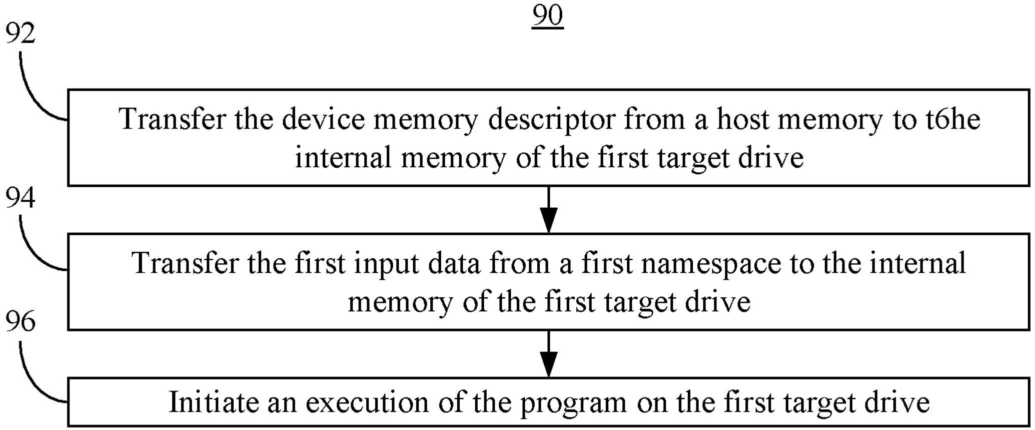
FIG. 4 is a flowchart of an example of a method of configuring an initial target drive to execute a program on input data according to an embodiment.

FIG. 4 shows a method 90 of configuring an initial/first target drive to execute a program on input data. The method 90 may generally be incorporated into block 86 (FIG. 3), already discussed. More particularly, the method 90 may be implemented in one or more modules as a set of logic instructions stored in a machine- or computer-readable storage medium such as RAM, ROM, PROM, firmware, flash memory, etc., in hardware, or any combination thereof.

Illustrated processing block 92 provides for transferring the device memory descriptor from a host memory to the internal memory of the first target drive. In an embodiment, block 92 also maps the device memory descriptor to the first memory region. Additionally, block 94 may transfer the first input data from a first namespace to the internal memory of the first target drive, wherein block 96 initiates an execution of the program on the first target drive (e.g., via an execute command).

Figure 5:
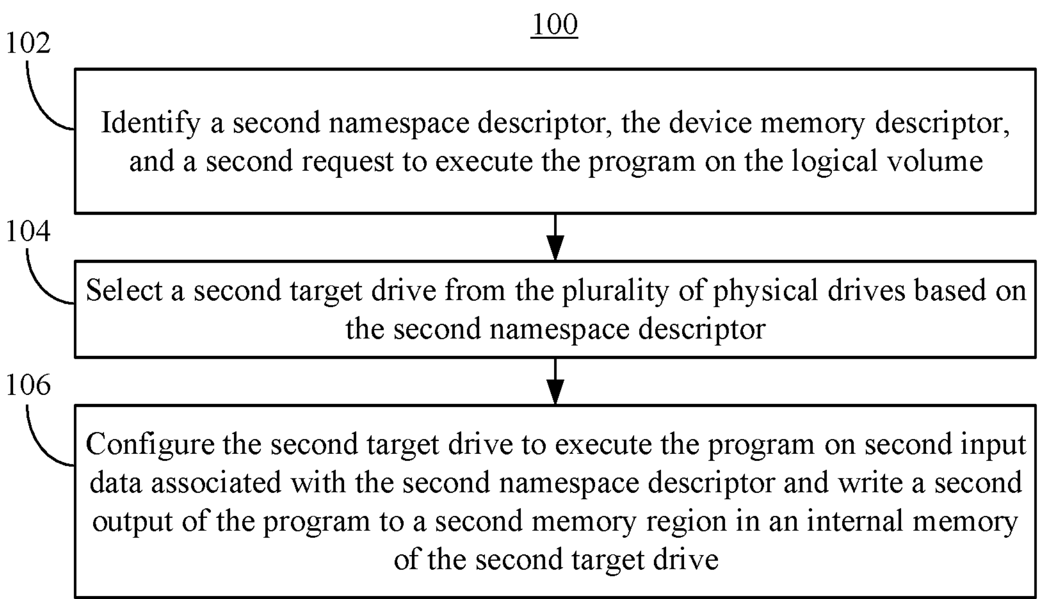
FIG. 5 is a flowchart of an example of a method of operating a library with respect to a subsequent request to execute a program on a logical volume that spans a plurality of physical drives according to an embodiment.

FIG. 5 shows a method 100 of operating a library with respect to a subsequent (e.g., second) request to execute a program on a logical volume that spans a plurality of physical drives. The method 100 may generally be implemented in a library such as, for example, the library 40 (FIG. 1) and/or the library 60 (FIGS. 2A-2D), already discussed, and in conjunction with the method 80 (FIG. 3), already discussed. More particularly, the method 100 may be implemented in one or more modules as a set of logic instructions stored in a machine- or computer-readable storage medium such as RAM, ROM, PROM, firmware, flash memory, etc., in hardware, or any combination thereof.

Illustrated processing block 102 provides for identifying (e.g., receiving in an application code message) a second namespace descriptor, the device memory descriptor, and a second request to execute the program on the logical volume. In an embodiment, block 104 selects a second target drive from the plurality of physical drives based on the second namespace descriptor. Additionally, block 106 may configure the second target drive to execute the program on second input data associated with the second namespace descriptor and write a second output of the program to a second memory region in an internal memory of the second target drive.

Figure 6:
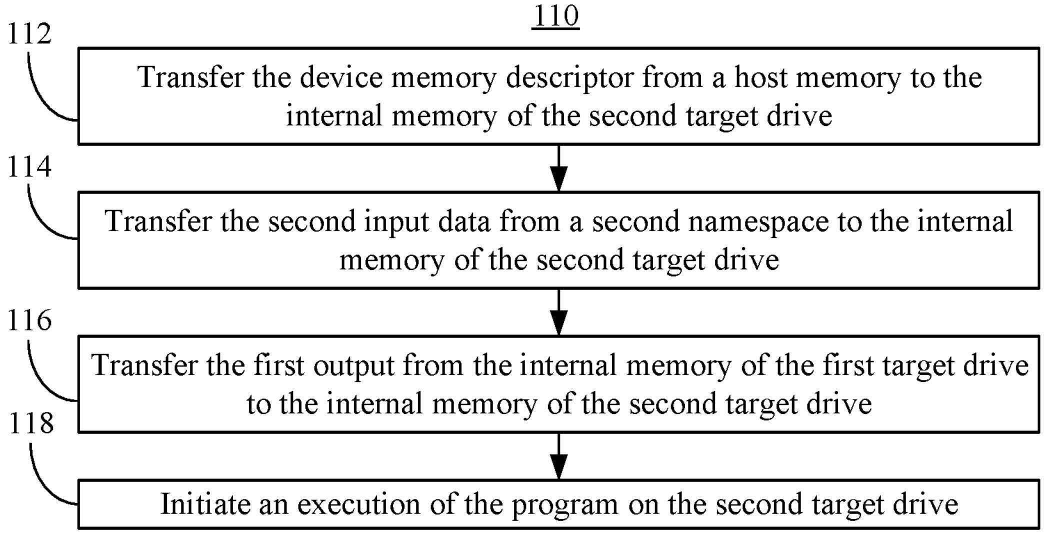
FIG. 6 is a flowchart of an example of a method of configuring a subsequent target drive to execute a program on input data according to an embodiment.

FIG. 6 shows a method 110 of configuring a subsequent/second target drive to execute a program on input data. The method 110 may generally be incorporated into block 106 (FIG. 3), already discussed. More particularly, the method 110 may be implemented in one or more modules as a set of logic instructions stored in a machine- or computer-readable storage medium such as RAM, ROM, PROM, firmware, flash memory, etc., in hardware, or any combination thereof.

Illustrated processing block 112 provides for transferring the device memory descriptor from a host memory to the internal memory of the second target drive. In an embodiment, block 112 also maps the device memory descriptor to the second memory region. Additionally, block 114 transfers the second input data from a second namespace to the internal memory of the second target drive, wherein block 116 transfers (e.g., via peer-to-peer communications) the first output from the internal memory of the first target drive to the internal memory of the second target drive. In one example, block 118 initiates an execution of the program on the second target drive.

ADDITIONAL NOTES AND EXAMPLES

Example 1 includes a performance-enhanced computing system comprising a plurality of physical drives, a processor coupled to the plurality of physical drives, and a memory including a set of instructions, which when executed by the processor, cause the processor to select a first target drive from the plurality of physical drives based on a first namespace descriptor, wherein the first namespace descriptor is associated with a device memory descriptor and a first request to execute a program on a logical volume that spans a plurality of physical drives, and configure the first target drive to execute the program on first input data associated with the first namespace descriptor and write a first output of the program to a first memory region in an internal memory of the first target drive.

Example 2 includes the computing system of Example 1, wherein the instructions, when executed, further cause the processor to map the device memory descriptor to the first memory region.

Example 3 includes the computing system of Example 1, wherein to configure the first target drive to execute the program on the first input data, the instructions, when executed, further cause the processor to transfer the device memory descriptor from a host memory to the internal memory of the first target drive, transfer the first input data from a first namespace to the internal memory of the first target drive, and initiate an execution of the program on the first target drive.

Example 4 includes the computing system of any one of Examples 1 to 3, wherein the instructions, when executed, further cause the processor to select a second target drive from the plurality of physical drives based on a second namespace descriptor, wherein the second namespace descriptor is associated with the device memory descriptor and a second request to execute the program on the logical volume, and configure the second target drive to execute the program on second input data associated with the second namespace descriptor and write a second output of the program to a second memory region in an internal memory of the second target drive.

Example 5 includes the computing system of Example 4, wherein the instructions, when executed, further cause the processor to map the device memory descriptor to the second memory region.

Example 6 includes the computing system of Example 4, wherein to configure the second target drive to execute the program on the second input data, the instructions, when executed, further cause the computing system to transfer the device memory descriptor from a host memory to the internal memory of the second target drive, transfer the second input data from a second namespace to the internal memory of the second target drive, transfer the first output from the internal memory of the first target drive to the internal memory of the second target drive, and initiate an execution of the program on the second target drive.

Example 7 includes the computing system of Example 4, wherein the instructions, when executed, further cause the computing system to write the program to the plurality of physical drives.

Example 8 includes at least one computer readable storage medium comprising a set of instructions, which when executed by a computing system, cause the computing system to select a first target drive from the plurality of physical drives based on a first namespace descriptor, wherein the first namespace descriptor is associated with a device memory descriptor and a first request to execute a program on a logical volume that spans a plurality of physical drives, and configure the first target drive to execute the program on first input data associated with the first namespace descriptor and write a first output of the program to a first memory region in an internal memory of the first target drive.

Example 9 includes the at least one computer readable storage medium of Example 8, wherein the instructions, when executed, further cause the computing system to map the device memory descriptor to the first memory region.

Example 10 includes the at least one computer readable storage medium of Example 8, wherein to configure the first target drive to execute the program on the first input data, the instructions, when executed, further cause the computing system to transfer the device memory descriptor from a host memory to the internal memory of the first target drive, transfer the first input data from a first namespace to the internal memory of the first target drive, and initiate an execution of the program on the first target drive.

Example 11 includes the at least one computer readable storage medium of any one of Examples 8 to 10, wherein the instructions, when executed, further cause the computing system to select a second target drive from the plurality of physical drives based on a second namespace descriptor, wherein the second namespace descriptor is associated with the device memory descriptor and a second request to execute the program on the logical volume, and configure the second target drive to execute the program on second input data associated with the second namespace descriptor and write a second output of the program to a second memory region in an internal memory of the second target drive.

Example 12 includes the at least one computer readable storage medium of Example 11, wherein the instructions, when executed, further cause the computing system to map the device memory descriptor to the second memory region.

Example 13 includes the at least one computer readable storage medium of Example 11, wherein to configure the second target drive to execute the program on the second input data, the instructions, when executed, further cause the computing system to transfer the device memory descriptor from a host memory to the internal memory of the second target drive, transfer the second input data from a second namespace to the internal memory of the second target drive, transfer the first output from the internal memory of the first target drive to the internal memory of the second target drive, and initiate an execution of the program on the second target drive.

Example 14 includes the at least one computer readable storage medium of Example 11, wherein the instructions, when executed, further cause the computing system to write the program to the plurality of physical drives.

Example 15 includes a method of operating a library, the method comprising selecting a first target drive from the plurality of physical drives based on a first namespace descriptor, wherein the first namespace descriptor is associated with a device memory descriptor and a first request to execute a program on a logical volume that spans a plurality of physical drives, and configuring the first target drive to execute the program on first input data associated with the first namespace descriptor and write a first output of the program to a first memory region in an internal memory of the first target drive.

Example 16 includes the method of Example 15, further including mapping the device memory descriptor to the first memory region.

Example 17 includes the method of Example 15, wherein configuring the first target drive to execute the program on the first input data includes transferring the device memory descriptor from a host memory to the internal memory of the first target drive, transferring the first input data from a first namespace to the internal memory of the first target drive, and initiating an execution of the program on the first target drive.

Example 18 includes the method of any one of Examples 15 to 17, further including selecting a second target drive from the plurality of physical drives based on a second namespace descriptor, wherein the second namespace descriptor is associated with the device memory descriptor and a second request to execute the program on the logical volume, and configuring the second target drive to execute the program on second input data associated with the second namespace descriptor and write a second output of the program to a second memory region in an internal memory of the second target drive.

Example 19 includes the method of Example 18, further comprising mapping the device memory descriptor to the second memory region.

Example 20 includes the method of Example 18, wherein configuring the second target drive to execute the program on the second input data includes transferring the device memory descriptor from a host memory to the internal memory of the second target drive, transferring the second input data from a second namespace to the internal memory of the second target drive, transferring the first output from the internal memory of the first target drive to the internal memory of the second target drive, and initiating an execution of the program on the second target drive.

Example 21 includes an apparatus comprising means for performing the method of any one of Examples 15 to 20.

Technology described herein therefore does not require the application to be aware of the physical location of logical volume data. The technology also does not require the application to be aware of the actual available CS resources (compute, memory) on the physical devices. Moreover, the technology maintains the same application programming interface whether the logical volume spans multiple physical devices or is contained within a single physical device. Additionally, the technology is compatible with the NVMe CS model at the physical device level.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:

a hardware interface to couple to a plurality of physical drives, the plurality of physical drives being computational storage (CS) having a local memory and a computational resource at a storage device; and a processor to execute logical volume management (LVM) to manage the plurality of physical drives, including to allocate a composed namespace that spans the plurality of physical drives with portions stored in the plurality of physical drives, the LVM to issue a CS command to execute a program at a storage device for a logical volume stored in the plurality of physical drives, issuance of the CS command, including the LVM to:

select a first target drive from the plurality of physical drives based on a first namespace descriptor that identifies the first target drive for a first data portion and a first local memory offset for program execution on the first data portion, send first input data, and receive a first output of the program from a first memory region in the local memory of the first target drive.

2. The computing system of claim 1, wherein to issue the CS command to execute the program on the first target drive includes the LVM to:

transfer the first input data from a first namespace to the local memory of the first target drive, and initiate an execution of the program on the first target drive.

3. The computing system of claim 1, wherein the LVM is further to:

select a second target drive from the plurality of physical drives based on a second namespace descriptor that identifies the second target drive for a second data portion and a second local memory offset for program execution on the second data portion, send second input data, and receive a second output of the program from a second memory region in the local memory of the second target drive.

4. The computing system of claim 3, wherein to issue the CS command to execute the program on the second target drive includes the LVM to:

transfer the second input data from a second namespace to the local memory of the second target drive, transfer the first output from the local memory of the first target drive to the local memory of the second target drive, and initiate an execution of the program on the second target drive.

5. The computing system of claim 3, wherein the the LVM is further to write the program to the plurality of physical drives.

6. The computing system of claim 1, wherein the first namespace descriptor identifies a namespace extent used in the CS command, and wherein the first namespace descriptor is associated with a device memory descriptor that identifies the local memory offset for the CS command and with a host memory descriptor that identifies a region in host memory for the CS command.

7. The computing system of claim 6, wherein the LVM is to store the first namespace descriptor, the device memory descriptor, and the host memory descriptor in a descriptor library accessed as a layer of indirection specific to issuance of CS commands.

8. The computing system of claim 6, further comprising storing the first namespace descriptor, the device memory descriptor, and the host memory descriptor in a descriptor library accessed as a layer of indirection specific to issuance of CS commands.

9. A storage system comprising:

a plurality of physical drives, the plurality of physical drives being computational storage (CS) having a local memory and a computational resource at a storage device; and a logical volume management (LVM) device to manage the plurality of physical drives, including to allocate a composed namespace that spans the plurality of physical drives with portions stored in the plurality of physical drives, the LVM device to issue a CS command to execute a program at a storage device for a logical volume stored in the plurality of physical drives, issuance of the CS command, including the LVM device to:

select a first target drive from the plurality of physical drives based on a first namespace descriptor that identifies the first target drive for a first data portion and a first local memory offset for program execution on the first data portion, send first input data, and receive a first output of the program from a first memory region in the local memory of the first target drive.

10. The storage system of claim 9, wherein to issue the CS command to execute the program on the first target drive includes the LVM device to:

transfer the first input data from a first namespace to the local memory of the first target drive; and initiate an execution of the program on the first target drive.

11. The storage system of claim 9, wherein the LVM device is further to:

select a second target drive from the plurality of physical drives based on a second namespace descriptor that identifies the second target drive for a second data portion and a second local memory offset for program execution on the second data portion, send second input data, and receive a second output of the program from a second memory region in the local memory of the second target drive.

12. The storage system of claim 11, wherein to issue the CS command to execute the program on the second target drive includes the LVM device to:

transfer the second input data from a second namespace to the local memory of the second target drive;

transfer the first output from the local memory of the first target drive to the local memory of the second target drive; and initiate an execution of the program on the second target drive.

13. The storage system of claim 11, wherein the the LVM device is further to write the program to the plurality of physical drives.

14. The storage system of claim 9, wherein the first namespace descriptor identifies a namespace extent used in the CS command, and wherein the first namespace descriptor is associated with a device memory descriptor that identifies the local memory offset for the CS command and with a host memory descriptor that identifies a region in host memory for the CS command.

15. The storage system of claim 14, wherein the LVM device is to store the first namespace descriptor, the device memory descriptor, and the host memory descriptor in a descriptor library accessed as a layer of indirection specific to issuance of CS commands.

16. A method comprising:

in a storage system having a plurality of physical drives, the plurality of physical drives being computational storage (CS) having a local memory and a computational resource at a storage device, allocating a composed namespace that spans the plurality of physical drives with portions stored in the plurality of physical drives; and issuing a CS command to execute a program at a storage device for a logical volume stored in the plurality of physical drives, including:

selecting a first target drive from the plurality of physical drives based on a first namespace descriptor that identifies the first target drive for a first data portion and a first local memory offset for program execution on the first data portion;

sending first input data; and receiving a first output of the program from a first memory region in the local memory of the first target drive.

17. The method of claim 16, wherein issuing the CS command to execute the program on the first target drive includes:

transferring the first input data from a first namespace to the local memory of the first target drive; and initiating an execution of the program on the first target drive.

18. The method of claim 16, further including:

selecting a second target drive from the plurality of physical drives based on a second namespace descriptor that identifies the second target drive for a second data portion and a second local memory offset for program execution on the second data portion;

sending second input data; and configuring descriptor that identifies the second target drive for a second data portion and a second local memory offset for program execution on the second data portion, send second input data, and receive a second output of the program from a second memory region in the local memory of the second target drive.

19. The method of claim 18, wherein to execute the program on the second target drive includes:

transferring the second input data from a second namespace to the local memory of the second target drive;

transferring the first output from the local memory of the first target drive to the local memory of the second target drive; and initiating an execution of the program on the second target drive.

20. The method of claim 16, wherein the first namespace descriptor identifies a namespace extent used in the CS command, and wherein the first namespace descriptor is associated with a device memory descriptor that identifies the local memory offset for the CS command and with a host memory descriptor that identifies a region in host memory for the CS command.

* * * * *